(12) United States Patent
Yasukagawa

(10) Patent No.: US 11,800,628 B2
(45) Date of Patent: Oct. 24, 2023

(54) PLASMA HEATING DEVICE

(71) Applicant: KABUSHIKI KAISHA SENRYOU, Natori (JP)

(72) Inventor: Makoto Yasukagawa, Natori (JP)

(73) Assignee: KABUSHIKI KAISHA SENRYOU, Natori (JP)

( * ) Notice: Subject to any disclaimer, the term of this patent is extended or adjusted under 35 U.S.C. 154(b) by 74 days.

(21) Appl. No.: 17/718,654

(22) Filed: Apr. 12, 2022

(65) Prior Publication Data

US 2023/0056960 A1 Feb. 23, 2023

(30) Foreign Application Priority Data

Aug. 19, 2021 (JP) .................................. 2021-133972

(51) Int. Cl.
*H05H 1/24* (2006.01)

(52) U.S. Cl.
CPC ...................................... *H05H 1/24* (2013.01)

(58) Field of Classification Search
None
See application file for complete search history.

(56) References Cited

U.S. PATENT DOCUMENTS

| | | | |
|---|---|---|---|
| 3,156,622 A * | 11/1964 | Hill | ........................... H05H 1/10 376/140 |
| 5,606,588 A * | 2/1997 | Umstadter | ............. H05G 2/001 378/119 |
| 6,474,404 B1 * | 11/2002 | Grothe | .................... B22D 11/11 164/133 |
| 2006/0216604 A1 * | 9/2006 | Kawase | .............. H01M 4/0426 429/231.95 |
| 2011/0049907 A1 * | 3/2011 | Yasukagawa | ........... F03G 7/107 74/DIG. 9 |
| 2017/0365843 A1 * | 12/2017 | Kawase | .............. H01M 4/1395 |
| 2018/0175423 A1 * | 6/2018 | Yasukagawa | ........... C25B 15/08 |

(Continued)

FOREIGN PATENT DOCUMENTS

| | | | | |
|---|---|---|---|---|
| JP | 5741220 B2 * | 7/2015 | ............... | H05H 1/24 |
| JP | 6753627 B1 * | 9/2020 | ............... | H05H 1/24 |
| JP | 6753627 B1 | 9/2020 | | |

(Continued)

*Primary Examiner* — Srinivas Sathiraju
(74) *Attorney, Agent, or Firm* — Oliff PLC

(57) ABSTRACT

A plasma heating device efficiently generates a high temperature. A tubular conductor has a cylindrical inner surface covered with a negatively charged insulating film. A tubular anode is supported inside the conductor with insulating material. An incident pipe, with an inner surface covered with insulating film, is negatively charged and extends tangentially on the conductor and has an incident port at one end and the other end communicating with the inside of the conductor. Hydrogen gas is supplied inside the conductor through a pipe and anode. A vacuum chamber connects to a pump, the inside thereof communicates with the incident pipe. An electron gun produces an electron beam from the incident port through inside the vacuum chamber into the conductor wherein the electron beam is reflected by the negatively charged conductor and the gas in the conductor plasmalizes. A cooler surrounds the conductor and has a water flow path therein.

4 Claims, 1 Drawing Sheet

(56) References Cited

U.S. PATENT DOCUMENTS

| | | | |
|---|---|---|---|
| 2020/0211821 A1* | 7/2020 | Yasukagawa | H05H 9/048 |
| 2023/0056960 A1* | 2/2023 | Yasukagawa | H05H 1/24 |

FOREIGN PATENT DOCUMENTS

| | | | | |
|---|---|---|---|---|
| JP | 2021193646 A | * | 12/2021 | H05H 1/24 |
| JP | 7005069 B1 | * | 2/2022 | H05H 1/24 |
| JP | 2023028334 A | * | 3/2023 | H05H 1/24 |

\* cited by examiner

[Fig. 1]
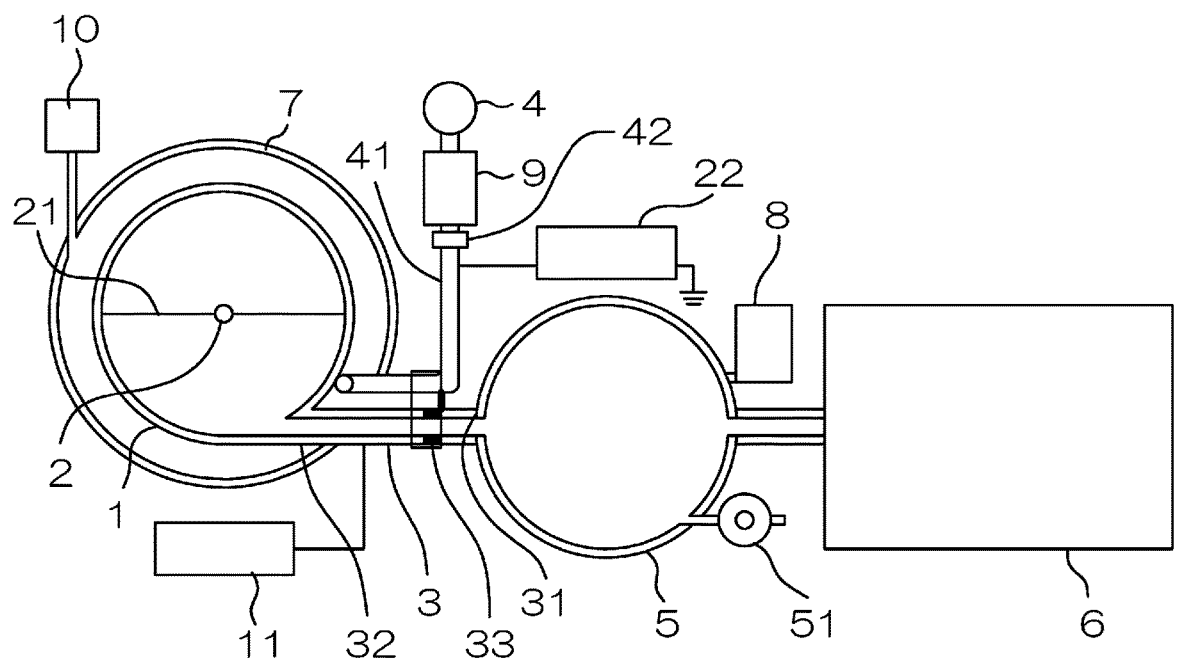
[Fig. 2]
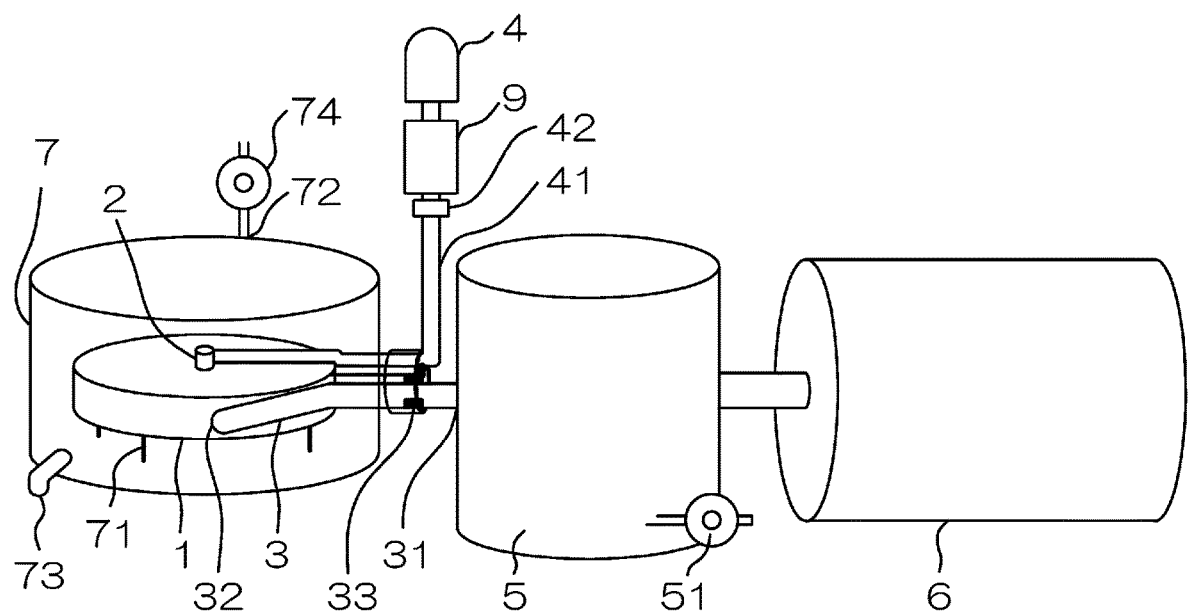

PLASMA HEATING DEVICE

FIELD OF THE INVENTION

The present invention relates to a plasma heating device.

DESCRIPTION OF RELATED ART

Previously, the present inventor has invented a plasma heating device in which an electron gun causes an electron beam to be incident from an incident port of an incident pipe inside a vacuum chamber to the inside of a tubular conductor; the incident electron beam is reflected by an inner surface of the tubular conductor charged negatively; hydrogen gas, heavy hydrogen gas, or helium gas supplied from a tank into the tubular conductor is plasmalized; and a high temperature can be generated by the plasmalization of the hydrogen gas, heavy hydrogen gas, or helium gas (for example, see Patent Literature 1).

CITATION LIST

Patent Literature 1: JP-B-6753627

SUMMARY OF THE INVENTION

There has been a demand for a plasma heating device that can improve upon the plasma heating device described in Patent Literature 1 and generate a high temperature more efficiently.

The present invention has been made focusing on such a problem, and it is an object of the present invention to provide a plasma heating device capable of efficiently generating a high temperature.

In order to achieve the above object, a plasma heating device according to the present invention includes: a tubular conductor having a cylindrical inner surface, which can be negatively charged and whose inner surface is covered with an insulating film; a tubular anode arranged on a central axis of the tubular conductor so as to be supported by an insulating material; an incident pipe having a straight tubular shape, which can be negatively charged and whose inner surface is covered with an insulating film, the incident pipe extending in a tangential direction of the inner surface of the tubular conductor, having an incident port at one end thereof and the other end coupled to the tubular conductor so as to communicate with the inside of the tubular conductor; a tank for supplying hydrogen gas, heavy hydrogen gas or helium gas; a supply pipe connected to the anode and the tank to supply the hydrogen gas, the heavy hydrogen gas or the helium gas from the tank to the inside of the tubular conductor through the anode; a vacuum chamber connected to a vacuum pump so that the inside thereof communicates with the one end of the incident pipe; an electron gun that causes an electron beam to be incident from the incident port through the inside of the vacuum chamber to the inside of the tubular conductor so that the electron beam is reflected by the negatively charged tubular conductor and plasmalizes the gas supplied from the tank into the tubular conductor; and a cooler that surrounds the tubular conductor and has a water flow path therein.

In the plasma heating device according to the present invention, the electron gun causes an electron beam to be incident from the incident port of the incident pipe through the inside of the vacuum chamber into the tubular conductor. The incident electron beam is repeatedly reflected by the inner surface of the negatively charged tubular conductor, and hydrogen gas, heavy hydrogen gas, or helium gas supplied from the tank into the tubular conductor through the supply pipe and the anode is plasmalized. In this way, it is possible to generate a high temperature efficiently by plasmalization of hydrogen gas, heavy hydrogen gas or helium gas. In addition, the excess electrons in the incident electron beam are absorbed by the anode to generate heat.

Further, the protons generated by plasmalization go toward the inner surface of the negatively charged tubular conductor and enter into the insulating film on the inner surface to form a heavy cation layer at a certain depth. This heavy cation layer can be thickened by supplying gas in the tank into the tubular conductor while continuing electron beam irradiation. When the heavy cation layer is thick enough to cause Rutherford backscattering, the protons generated by the plasmalization are directed toward the inner surface of the negatively charged tubular conductor, but are repelled by the heavy cation layer and continuously heated by the electron beam irradiation inside the tubular conductor to become high-temperature plasma. The temperature of the tubular conductor can be lowered by the water flowing through the water flow path of the cooler. The high-temperature water that has flowed through the water flow path can be used for power generation and heating.

In the plasma heating device according to the present invention, it is preferable that the incident pipe is provided with an incident pipe anode around the incident port, and the supply pipe is positively charged.

In this case, it is possible to prevent the protons generated inside the tubular conductor from leaking out from the incident pipe and the supply pipe.

The plasma heating device according to the present invention preferably further includes: an X-ray spectrometer for observing X-rays emitted from the vacuum chamber; and a gas flow rate controller for adjusting the flow rate of the gas supplied from the tank to the supply pipe.

According to the present invention, it is possible to provide a plasma heating device capable of efficiently generating a high temperature.

BRIEF DESCRIPTION OF THE DRAWINGS

FIG. 1 is a conceptual diagram of a central vertical cross-section showing a plasma heating device according to an embodiment of the present invention.

FIG. 2 is a perspective view of the plasma heating device shown in FIG. 1.

DETAILED DESCRIPTION OF THE INVENTION

Hereinafter, embodiments of the present invention will be described with reference to the drawings.

FIGS. 1 and 2 show a plasma heating device according to an embodiment of the present invention.

As shown in FIGS. 1 and 2, the plasma heating device includes a tubular conductor 1, an anode 2, an incident pipe 3, a tank 4, a vacuum chamber 5, an electron gun 6, a cooler 7, an X-ray spectrometer 8, a gas flow rate controller 9, and a thermometer 10.

The tubular conductor 1 has a cylindrical inner surface having a three-dimensional shape in which a circle is rotated once around the rotation axis at a predetermined distance from the rotation axis parallel to its diameter. The tubular conductor 1 is connected to a negative high-voltage power supply 11 via the incident pipe 3 and can be negatively charged. The inner surface of the tubular conductor 1 is covered with an insulating film (ferroelectric material). The voltage of the tubular conductor 1 is controlled to a voltage higher than the electron beam intensity so that the electron beam of the electron gun 6 does not reach the insulating film.

The anode 2 has a straight tubular shape, is arranged on the central axis of the tubular conductor 1, and is supported by the insulating material 21 on the inner surface of the tubular conductor 1. The anode 2 is connected to a positive high-voltage power supply 22 and is positively charged. One end of the anode 2 is closed and protrudes to the outside of the tubular conductor 1. The other end of the anode 2 is open inside the tubular conductor 1.

The incident pipe 3 has a straight tubular shape, is connected to a negative high voltage power source 11, can be negatively charged, and the inner surface thereof is covered with an insulating film. The incident pipe 3 is in a twisted position with respect to a torus rotation axis, and extends along the vertical plane of the torus rotation axis of the tubular conductor 1 in the tangential direction of the inner surface on the outer side of the maximum diameter of the tubular conductor 1. The incident pipe 3 has an incident port 31 at one end, and the other end 32 is coupled to the tubular conductor 1 and communicates with the inside of the tubular conductor 1. The incident pipe 3 is provided with an incident pipe anode 33 around the incident port 31. The incident pipe anode 33 is connected to the positive high-voltage power supply 22 and is positively charged.

The tank 4 stores hydrogen gas, heavy hydrogen gas, or helium gas inside and can supply the same to the supply pipe 41. The supply pipe 41 is connected to a positive high-voltage power supply 22 and is positively charged. The supply pipe 41 is connected to the anode 2 and the tank 4, and supplies hydrogen gas, heavy hydrogen gas, or helium gas from the tank 4 to the inside of the tubular conductor 1 through the anode 2. The supply pipe 41 is provided with a valve 42.

The vacuum chamber 5 is connected to the vacuum pump 51, and the inside can be depressurized to a vacuum. The inside of the vacuum chamber 5 communicates with the incident port 31 at one end of the incident pipe 3.

The electron gun 6 is connected to the vacuum chamber 5, and an electron beam is incident from the incident port 31 to the inside of the tubular conductor 1 through the inside of the vacuum chamber 5, and the electron beam is reflected by the negatively charged tubular conductor 1 so that the gas supplied from the tank 4 to the inside of the tubular conductor 1 is plasmalized. The electron beam irradiated by the electron gun 6 is preferably about 1 keV to 50 keV of 500 mA, and continuous irradiation is possible.

The cooler 7 is cylindrical and concentrically surrounds the tubular conductor 1. The tubular conductor 1 is supported by the insulator 71 inside and separated from the inner wall of the cooler 7. The cooler 7 has a water inlet 72 and a drainage outlet 73. A pump 74 is connected to the water inlet 72. For the pump 74, for example, a pump having a discharge pressure of 10 atm is used. The cooler 7 has a circulating water flow path therein. The circulating running water consists of pure water.

The X-ray spectrometer 8 is connected to the vacuum chamber 5 so as to observe the X-rays emitted from the vacuum chamber 5. The plasma temperature inside the tubular conductor 1 can be measured by observing the X-rays of the electromagnetic waves leaking through the incident pipe 3 with the X-ray spectrometer 8 and analyzing the spectrum thereof.

The gas flow rate controller 9 is connected between the tank 4 and the supply pipe 41, and can adjust the flow rate of the gas supplied from the tank 4 to the supply pipe 41.

The thermometer 10 can measure the temperature of the running water inside the cooler 7.

Next, the operation will be described.

In the plasma heating device, the electron gun 6 causes an electron beam to be incident from the incident port 31 of the incident pipe 3 through the inside of the vacuum chamber 5 to the inside of the tubular conductor 1 in a tangential direction. The incident electron beam is repeatedly reflected by the inner surface of the negatively charged tubular conductor 1 while being repelled in the direction along the inner side surface by the Coulomb force with negative potential, and the electron beam gradually diffuses to the entire inside of the tubular conductor 1.

Due to the Coulomb collision with the electron beam, the hydrogen gas, heavy hydrogen gas or helium gas supplied from the tank 4 to the inside of the tubular conductor 1 through the supply pipe 41 and the anode 2 is heated and plasmalized. When the electron beam irradiation is continued, the electron temperature and the proton temperature eventually reach a thermal equilibrium state and become the same temperature as the electron beam temperature. In this way, a high temperature can be efficiently generated by the plasmalization of the hydrogen gas, heavy hydrogen gas or helium gas. Further, the excess electrons in the incident electron beam are absorbed by the anode 2 to generate heat.

When the irradiation of a DC electron beam of about 1 keV of 500 mA while gradually injecting hydrogen gas or the like from the supply pipe 41 of +1000 V into the tubular conductor 1, the temperature of the protons generated by plasmalization eventually becomes the same temperature as the temperature of electrons, and the protons go toward the inner surface of the surrounding tubular conductor 1 negatively charged to −1000 V. The protons enter the insulating film on the inner surface of the tubular conductor 1 and form a heavy cation layer at a certain depth corresponding to the proton velocity (1 keV) (Bragg peak). This heavy cation layer can be thickened by continuously supplying hydrogen gas or the like in the tank 4 to the inside of the tubular conductor 1 while continuously irradiating an electron beam.

Once the heavy cation layer is thickened enough to cause the Rutherford backscattering, the negative charging voltage on the inner surface of the tubular conductor 1 is set to −10,000 V, the anode 2 is set to +10,000 V, and the irradiated electron beam is set to 500 mA and 10,000 V. Then, by injecting a very small amount of hydrogen gas or the like again into the tubular conductor 1, the newly generated protons go toward the inner surface of the negatively charged tubular conductor 1. However, when approaching the heavy cation layer, the Coulomb force becomes stronger in inverse proportion to the square of the distance, so that the protons are repelled by the cations forming the heavy cation layer and returned to the inside of the tubular conductor 1 (Rutherford backscattering). Therefore, these protons are continuously heated by the electron beam irradiation inside the tubular conductor 1 and become high-temperature plasma.

Since the incident pipe 3 is provided with the incident pipe anode 33 around the incident port 31, and the supply pipe 41 is positively charged by the positive high-voltage power supply 22, the protons generated inside the tubular conductor 1 can be prevented from leaking out from the incident pipe 3 and the supply pipe 41. The incident pipe anode 33 and the supply pipe 41 also play a role of absorbing excess electrons inside the tubular conductor 1 by electron beam irradiation and carrying them out of the plasma heating device.

When the plasma becomes hot, plasma pressure is generated by the collision of the particles with the inner surface of the tubular conductor 1. At 100 million degrees (10 keV) of the plasma temperature generated by irradiation of an electron beam of 10 keV, the plasma pressure at 300K, which is room temperature, becomes about 300,000 times the pressure. Therefore, the injection amount of hydrogen gas or the like is adjusted so that the pressure of hydrogen gas or the like in the initial state of the plasma heating process is about 1/100,000 atm. However, even in that case, the internal pressure applied to the tubular conductor 1 is about 6 atm. Therefore, in order to prevent the tubular conductor 1 from bursting, it is desirable to use the pump 74 to increase the water pressure inside the cooler 7. The temperature of the tubular conductor 1 can be lowered by the water flowing through the flowing water path of the cooler 7. The high-temperature water that has flowed through the water flow path can be used for power generation and heating.

The plasma temperature inside the tubular conductor 1 can be measured by observing X-rays of electromagnetic waves leaking through the electron beam incident pipe 3 and analyzing the spectrum thereof, as in X-ray astronomy.

REFERENCE SIGNS LIST

1: Tubular conductor
2: Anode
3: Incident pipe
4: Tank
5: Vacuum chamber
6: Electron gun
7: Cooler
8: X-ray spectrometer
9: Gas flow rate controller
10: Thermometer
11: Negative high-voltage power supply
21: Insulating material
22: Positive high-voltage power supply
31: Incident port
32: The other end of incident pipe
33: Incident pipe anode
41: Supply pipe
42: Valve
51: Vacuum pump
71: Insulator
72: Water inlet
73: Drainage outlet
74: Pump

What is claimed is:

1. A plasma heating device comprising:
    a tubular conductor having a cylindrical inner surface, which can be negatively charged and whose inner surface is covered with an insulating film;
    a tubular anode arranged on a central axis of the tubular conductor so as to be supported by an insulating material;
    an incident pipe having a straight tubular shape, which can be negatively charged and whose inner surface is covered with an insulating film, the incident pipe extending in a tangential direction of the inner surface of the tubular conductor, having an incident port at one end thereof and the other end coupled to the tubular conductor so as to communicate with the inside of the tubular conductor;
    a tank for supplying hydrogen gas, heavy hydrogen gas or helium gas;
    a supply pipe connected to the anode and the tank to supply the hydrogen gas, the heavy hydrogen gas or the helium gas from the tank to the inside of the tubular conductor through the anode;
    a vacuum chamber connected to a vacuum pump so that the inside thereof communicates with the one end of the incident pipe;
    an electron gun that causes an electron beam to be incident from the incident port through the inside of the vacuum chamber to the inside of the tubular conductor so that the electron beam is reflected by the negatively charged tubular conductor and plasmalizes the gas supplied from the tank into the tubular conductor; and
    a cooler that surrounds the tubular conductor and has a water flow path therein.

2. The plasma heating device according to claim 1, wherein
    the incident pipe is provided with an incident pipe anode around the incident port, and the supply pipe is positively charged.

3. The plasma heating device according to claim 2, further comprising:
    an X-ray spectrometer for observing X-rays emitted from the vacuum chamber; and
    a gas flow rate controller for adjusting the flow rate of the gas supplied from the tank to the supply pipe.

4. The plasma heating device according to claim 1, further comprising:
    an X-ray spectrometer for observing X-rays emitted from the vacuum chamber; and
    a gas flow rate controller for adjusting the flow rate of the gas supplied from the tank to the supply pipe.

* * * * *